US011353667B2

(12) United States Patent
Hung et al.

(10) Patent No.: US 11,353,667 B2
(45) Date of Patent: Jun. 7, 2022

(54) TRANSMITTER OPTICAL SUB-ASSEMBLY (TOSA) STRUCTURE AND AN ACTIVE ALIGNMENT METHOD THEREOF

(71) Applicant: Cloud Light Technology Limited, Hong Kong (HK)

(72) Inventors: Vincent Wai Hung, Hong Kong (HK); Wing Keung Mark Mak, Hong Kong (HK); Vivian Wei Ma, Hong Kong (HK)

(73) Assignee: Cloud Light Technology Limited, Hong Kong (HK)

( * ) Notice: Subject to any disclaimer, the term of this patent is extended or adjusted under 35 U.S.C. 154(b) by 0 days.

(21) Appl. No.: 16/880,983

(22) Filed: May 21, 2020

(65) Prior Publication Data

US 2021/0364712 A1   Nov. 25, 2021

(51) Int. Cl.
*G02B 6/42* (2006.01)

(52) U.S. Cl.
CPC ......... *G02B 6/4225* (2013.01); *G02B 6/4227* (2013.01); *G02B 6/4245* (2013.01); *G02B 6/4269* (2013.01)

(58) Field of Classification Search
CPC .. G02B 6/4225; G02B 6/4269; G02B 6/4245; G02B 6/4227
See application file for complete search history.

(56) References Cited

U.S. PATENT DOCUMENTS

| 9,548,817 | B1* | 1/2017 | Nagarajan | H01S 5/02251 |
| 9,880,366 | B2* | 1/2018 | Vallance | G02B 6/29367 |
| 10,230,471 | B2* | 3/2019 | Ho | H04J 14/025 |
| 10,615,567 | B1* | 4/2020 | Gelhausen | H01S 5/04256 |

* cited by examiner

*Primary Examiner* — John Bedtelyon

(57) ABSTRACT

A transmitter optical sub-assembly (TOSA) structure having an independent upward heat dissipation path for dissipating heat in an upward direction including an independent signal source, an LDU assembly including a laser diode emitting a plurality of optical signals, a cascade LDU holding the laser diode, a lens positioned in front of the laser diode on the cascade LDU and an optical bench assembly including an optical bench assembled on a photonic integrated circuit having a plurality of passive optical components assembled on the optical bench. In particular, the independent signal source, the laser diode and the cascade LDU, are independent from the plurality of passive optical components on the photonic integrated circuit.

14 Claims, 20 Drawing Sheets ically relate to the field of
the optical transceivers in the optical communication systems, more particularly relates to a transmitter optical assembly (TOSA) structure and an active alignment method of the transmitter optical assembly (TOSA) structure facilitating efficient thermal management thereof.

BACKGROUND OF THE INVENTION

In the optical communication field, the major function of light delivery module converts electrical signals to light signals, and light signals are converted to a kind of module of electric signals again.

In the era of information, the rapidly increasing adoption of cloud computing, artificial intelligence and 5 G mobile applications has resulted in ever-increasing reliance on robust and ultra-high-speed communication and data center infrastructure. The optical fiber communication technologies play a vital role in the rapid advance of such infrastructure. To cope with the increase in data rate and interconnect density, per-lane data rate for optical transceivers increases from 25 Gbps to 100 Gbps and beyond. At the same time, the optical modulation formats migrate from non-return-to-zero (NRZ) to 4-level pulse amplitude modulation (PAM-4) and coherent modulation, while the transmission medium transitions from parallel transmission (PSM) to wavelength division multiplexing (WDM). Under such rapid technology evolution, silicon photonics integrated circuit with its ability to enable ultra-high-speed modulator and high-density integrated optics is proven to be the ideal solution for optical transceiver design.

The silicon photonic optical transceiver typically requires a high-power continuous wave (CW) laser diode (LD) as the optical source for modulation. Such CW laser sources can be fabricated onto silicon photonics wafers using hybrid integration techniques. However, it suffers from quality issues due to burn-in yield loss.

Another approach is to have a high-power external CW laser co-packaged with the PIC to form a complete transmitter optical sub-assembly (TOSA) as illustrated in Prior-art FIG. 1. In particular, the CW LD is assembled on top of a LD submount which is placed directly on the PIC. Some optical components precisely placed in front of the LD light path are used to focus the beam and steer it to couple into the waveguide on the PIC through a grating coupler (GC).

One major disadvantage of the TOSA as depicted in prior art FIG. 1, is the high relative placement accuracy between multiple micro-optical components, waveguide on the PIC and the laser diode. And, the active alignment process is used to precisely place each of the optical components and laser diode to achieve the required coupling efficiency of optical power from the CW laser into the waveguide on the PIC via the grating coupler. Moreover, the performing active alignment on multiple optical components on the PIC is an extremely challenging process leading to very low process yield.

Another disadvantage is the management of heat generated from the CW laser diode during operation. And to maximize transmission data rate, each PIC would normally have multiple high-speed optical channels, requiring multiple CW lasers to be co-packaged on top of the small area on the PIC to provide the required optical power and generating a significant amount of heat from these CW laser assemblies. All the generated heat can only be dissipated to the heat sink through a long thermal path via the laser submount, the PIC and the PIC submount. Further, the bonding interfaces between each of the components also add to the thermal resistance leading to heat accumulation near the PIC resulting in elevated laser diode temperature, lower output power due to thermal roll-off and most importantly, short laser lifetime.

Thus, to overcome the thermal dissipation problem while allowing active alignment process there is a need to provide a TOSA structure that provides a direct thermal path for each signal source to outer heatsink without passing through the photonic integrated circuit. The present invention relates to a transmitter optical sub-assembly (TOSA) structure having an independent upward heat dissipation path and a method for dissipating heat in an upward direction.

SUMMARY OF THE INVENTION

An embodiment of the present disclosure relates to a transmitter optical sub-assembly (TOSA) structure for efficient heat dissipation by dissipating heat in an upward direction. The transmitter optical sub-assembly (TOSA) structure includes an independent signal source, an LDU assembly and an optical bench assembly.

In particular, the LDU assembly further includes a laser diode emitting a plurality of optical signals, a cascade LDU holding the laser diode and a lens positioned in front of the laser diode on the cascade LDU. Moreover, the optical bench assembly is assembled on a photonic integrated circuit. And, the optical bench assembly further includes an optical substrate and a plurality of passive optical components. Furthermore, the independent signal source, the laser diode and the cascade LDU of the transmitter optical sub-assembly (TOSA) structure are independent of the plurality of passive optical components on the photonic integrated circuit.

In accordance with an embodiment of the present invention, the independent signal source is operably configured to actively align into an optical path for optical power coupling with the photonic integrated circuit. In particular, the independent signal source is a light source.

In accordance with an embodiment of the present invention, the independent signal source has a direct thermal path to an outer heatsink without passing through the photonic integrated circuit.

In accordance with an embodiment of the present invention, the cascade LDU is a flipped cascade LDU. In particular, the flipped cascade LDU is operably configured for dissipating heat in the upward direction.

In accordance with an embodiment of the present invention, the flipped cascade LDU is mounted over a U-shape block.

In accordance with an embodiment of the present invention, the U-shape block is made of a material having a lower thermal conductivity than the cascade LDU.

In accordance with an embodiment of the present invention, the plurality of passive optical components further comprising one or more isolators and one or more prisms.

In accordance with an embodiment of the present invention, the lens is a coupling lens.

In accordance with an embodiment of the present invention, the cascade LDU further includes a front surface and a front recess on front surface, a back surface and a back recess on back surface. In particular, the front surface is configured with a plurality of front metal pads. And, the back recess is configured with a plurality of back metal pads.

In accordance with one embodiment of the present invention, the plurality of back metal pads is electrically connected to the plurality of front metal pads through a vertical interconnect access electrical connection.

In accordance with another embodiment of the present invention, the plurality of back metal pads is electrically connected to the plurality of front metal pads through a sidewall metal edge connection.

In accordance with an embodiment of the present invention, the front recess of the cascade LDU is configured with an optical platform for active alignment of the lens.

In accordance with an embodiment of the present invention, the back recess of the cascade LDU is operably configured with a wire bond platform for forming a wire bond connection to power up the laser diode.

In accordance with an embodiment of the present invention, the optical substrate is a transparent optical substrate. In particular, the transparent optical substrate has a plurality of protrudes. Moreover, the plurality of passive optical components is assembled on the transparent optical substrate.

In accordance with an embodiment of the present invention, the transmitter optical sub-assembly (TOSA) structure is an integrated transmitter optical sub-assembly (TOSA) structure. In particular, the integrated transmitter optical sub-assembly (TOSA) structure includes an integrated unit. Moreover, the integrated unit has the laser diode and the coupling lens incorporated in a U-shape block and deposited on a flipped cascade LDU.

In accordance with an embodiment of the present invention, the integrated unit is actively aligned to the photonic integrated circuit through the plurality of passive optical components.

Another embodiment of the present invention relates to an active alignment method of a transmitter optical sub-assembly (TOSA) structure for efficient heat dissipation by dissipating heat in an upward direction. The active alignment method further including steps of forming an optical bench assembly on a photonic integrated circuit, forming an LDU assembly, active aligning of the LDU assembly and optical bench assembly with the photonic integrated circuit for a maximum coupling efficiency into the grating coupler, monitoring an optical output power received by the photonic integrated circuit, detecting a maximum power output for fixing the LDU assembly and optical bench assembly on the top of the photonic integrated circuit and forming wire bond with a plurality of back metal pads at a back recess to complete an electrical connection for laser diode.

In accordance with one embodiment of the present invention, the LDU assembly and optical bench assembly is fixed on the top of the photonic integrated circuit by applying a thermally curable adhesive.

In accordance with another embodiment of the present invention, the LDU assembly and optical bench assembly is fixed on the top of the photonic integrated circuit by ultraviolet light (UV) curable adhesive.

In accordance with an embodiment of the present invention, forming of the optical bench assembly by assembling the optical bench on the photonic integrated circuit to couple light into an optical waveguide and placing the plurality of passive optical components are placed on the optical bench. In particular, the plurality of passive optical components includes one or more isolators and one or more prisms.

In accordance with an embodiment of the present invention, step of forming of the LDU assembly further includes depositing a laser diode on a cascade LDU by a die attach, placing a lens in front of the laser diode on the cascade LDU, flipping the cascade LDU with bottom-side up forming a flipped cascade LDU and mounting the flipped cascade LDU with bottom-side up over a U-shape block.

In accordance with an embodiment of the present invention, the step of depositing a laser diode on a cascade LDU by a die attach further includes creating a plurality of front metal pads on a front surface of the cascade LDU, creating a plurality of back metal pads on a back recess of the cascade LDU, electrically connecting the plurality of back metal pads to the plurality of front metal pads through a vertical interconnect access electrical connection or an edge electrical connection. In particular, the front recess of the cascade LDU is configured with an optical platform for active alignment of the lens. Moreover, the back recess of LDU is operably configured with a wire bond platform for forming a wire bond to power up the laser diode.

In accordance with an embodiment of the present invention, the independent upward heat dissipation path transfers heat to the outer heatsink (185) through the outer heat sink contact method without passing through the photonic integrated circuit.

The foregoing objectives of the present invention are attained by employing a transmitter optical sub-assembly (TOSA) structure having an independent upward heat dissipation path for dissipating heat in an upward direction to outer heatsink without passing through the photonic integrated circuit.

BRIEF DESCRIPTION OF THE DRAWINGS

So that the manner in which the above recited features of the present invention is be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

Figure 1:
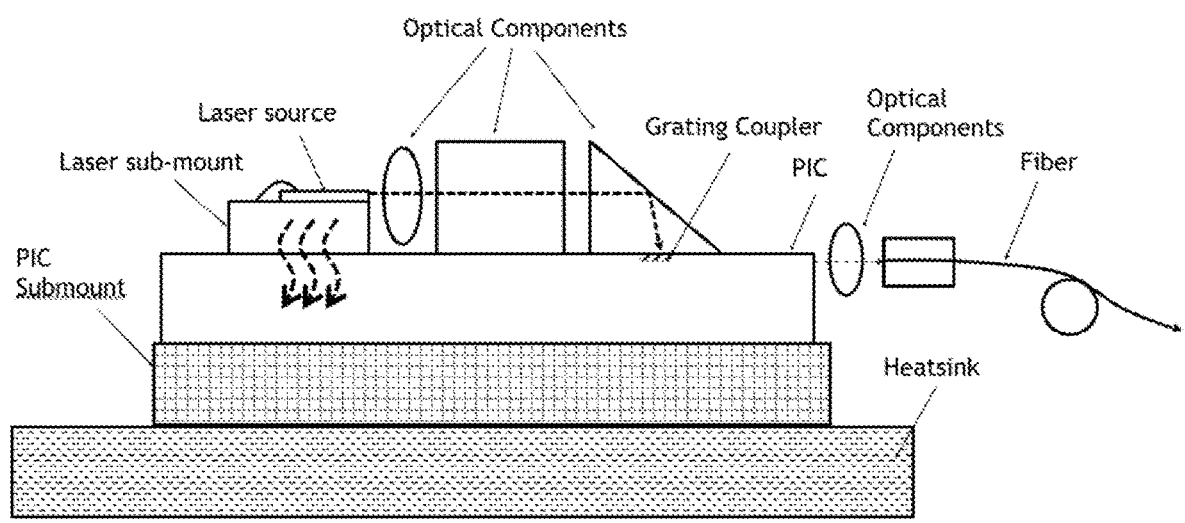
FIG. 1 is a pictorial representation illustrating a transmitter optical sub-assembly (TOSA) in accordance with a prior art.

Signal source 105
LDU assembly 300
Optical bench assembly 200
Plurality of passive optical components 110
Photonic integrated circuit 115
Optical bench 120
Optical path 125
Cascade LDU 130
U-shape block 135
Laser diode 140
Lens 145
Front surface 150
Front metal pads 155
Front Recess 158
Back surface 160
Back metal pads 165
Back Recess 168
Electrical connection 170
Wire bond 175
Flipped cascade LDU 180
Outer heatsink 185
Module upper cover 190
Heat dissipation path 195
Front opening 805

DETAILED DESCRIPTION

The present invention relates a transmitter optical sub-assembly (TOSA) structure having an independent upward heat dissipation path and an active alignment for dissipating heat in an upward direction to outer heatsink without passing through the photonic integrated circuit.

The principles of the present invention and their advantages are best understood by referring to FIG. 1A to FIG. 14. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Various embodiments of the present invention provide a transmitter optical sub-assembly (TOSA) structure having an independent upward heat dissipation path and an active alignment for dissipating heat in an upward direction to outer heatsink without passing through the photonic integrated circuit.

Figure 1A:
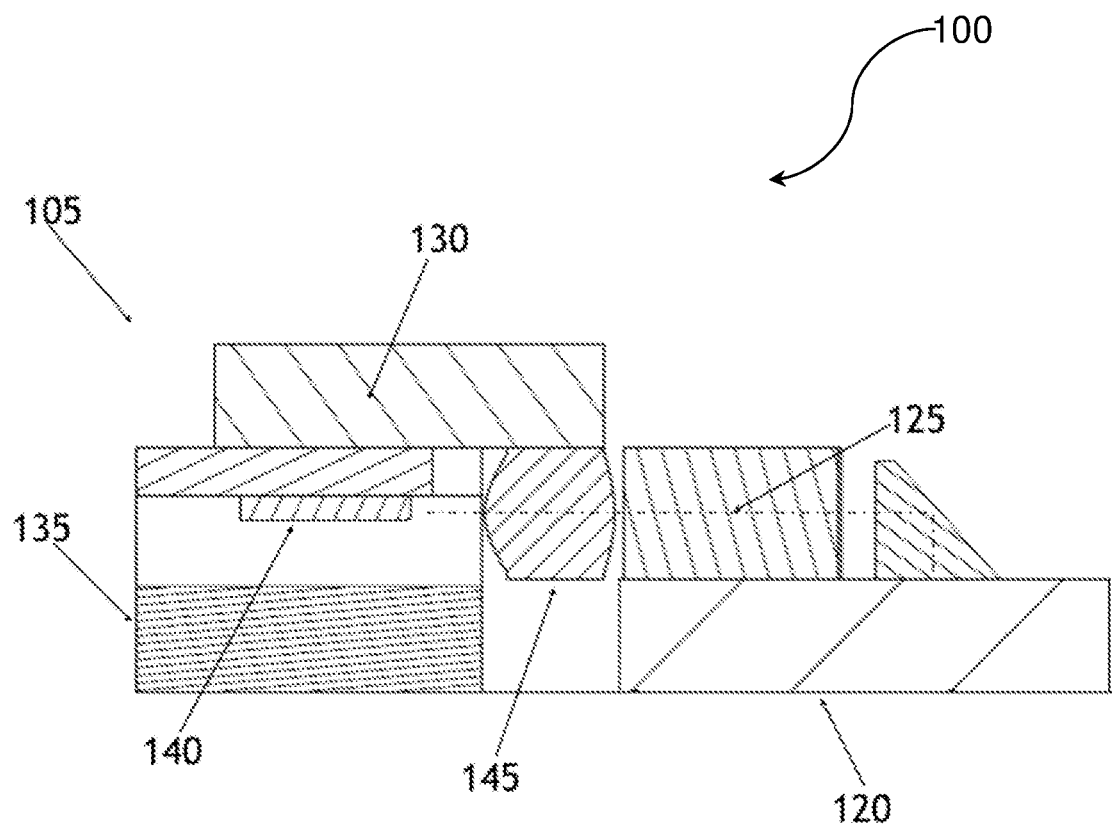
FIG. 1A is a pictorial representation illustrating a cross-sectional view of a transmitter optical sub-assembly (TOSA) structure in accordance with an embodiment of the present invention.
Figure 1B:
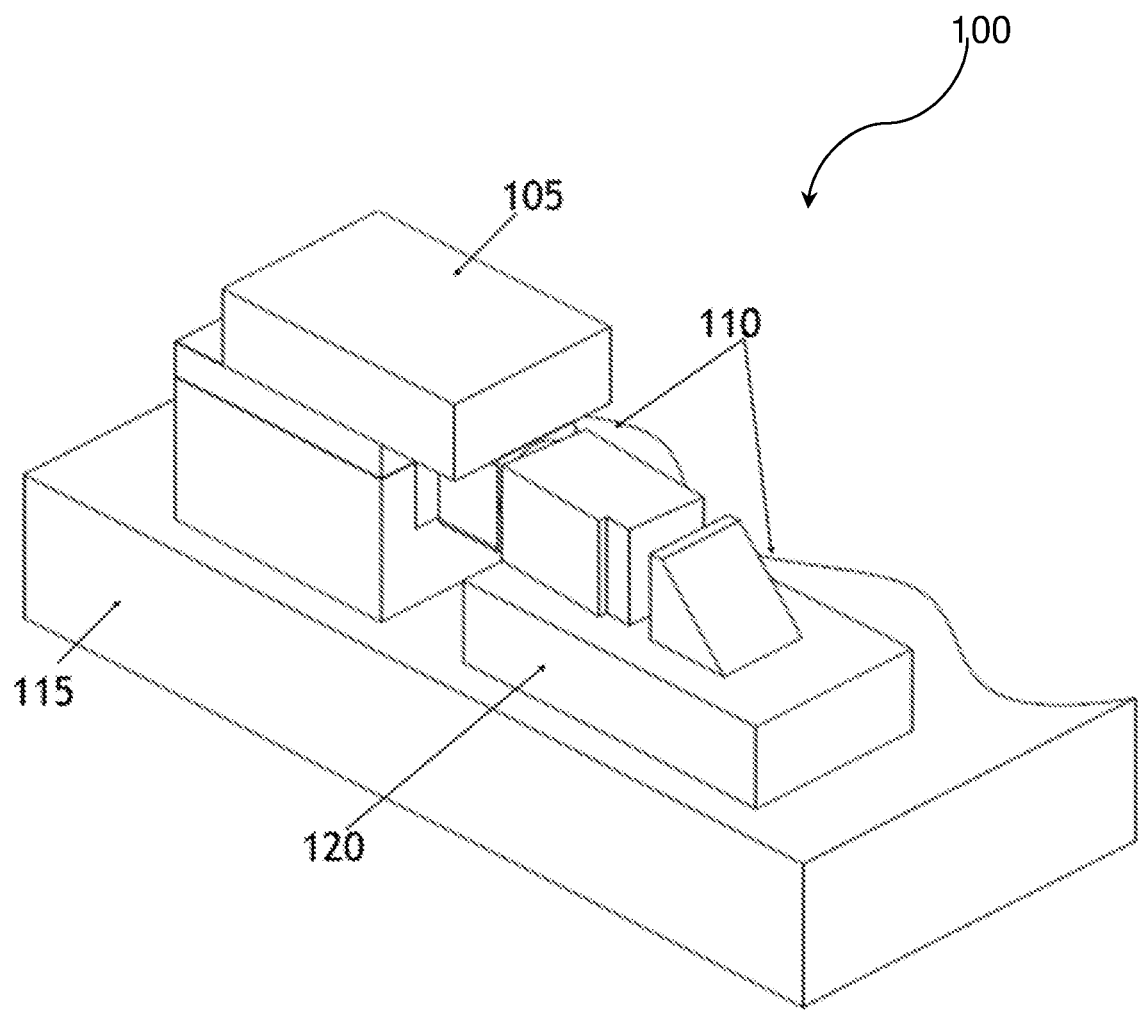
FIG. 1B is a pictorial representation illustrating a perspective view of the transmitter optical sub-assembly (TOSA) structure in accordance with an embodiment of the present invention.

FIG. 1A and FIG. 1B is a pictorial representation illustrating a cross-sectional view and perspective view of a transmitter optical sub-assembly (TOSA) structure respectively in accordance with one or more embodiments of the present invention. In particular, the transmitter optical sub-assembly (TOSA) structure (100) has an independent upward heat dissipation path for dissipating heat in an upward direction. The transmitter optical sub-assembly (TOSA) structure (100) includes a signal source (105) which having an LDU assembly (300) as the major part and an optical bench assembly (200).

Particularly, the signal source is a light source. Moreover, the LDU assembly (300) further includes a laser diode (140) emitting a plurality of optical signals, a cascade LDU (130) holding the laser diode (140) and a lens (145) positioned in front of the laser diode (140) on the cascade LDU (130). Furthermore, the cascade LDU (130) is flipped with the bottom side up forming a flipped cascade LDU (180) and the flipped cascade LDU (180) is mounted over a U-shape block (135). The flipped cascade LDU (180) is operably configured for dissipating heat in the upward direction and the U-shape block (135) is made of a material having a lower thermal conductivity than the cascade LDU (130).

In particular, the optical bench assembly (200) further includes an optical bench assembled on a photonic integrated circuit (115) to couple light into an optical waveguide and a plurality of passive optical components (110) assembled on the optical bench (120). Moreover, the plurality of passive optical components (110) further comprising one or more isolators and one or more prisms. Furthermore, the plurality of passive optical components (110) is placed on the optical bench by using by precision passive alignment marks to ensure that the plurality of passive optical components (110) are in the right position on the optical bench (120).

The signal source (105) including the laser diode (140) and the cascade LDU (130) on the LDU assembly (300) are independent of the optical bench assembly (200) on the photonic integrated circuit (115) for efficient heat dissipation and dissipating heat in the upward direction.

Subsequently, the signal source (105) is operably configured to actively align into an optical path (125) for optical power coupling with the photonic integrated circuit (115) as illustrated in FIG. 1B. In particular, the signal source (105) is actively aligned with the optical path (125) by lighting the laser diode (140) and monitoring the optical output power received by the photonic integrated circuit (115).

In accordance with an embodiment of the present invention, the signal source (105) has a heat dissipation path (195) to an outer heatsink (185) without passing through the photonic integrated circuit (115).

In accordance with an embodiment of the present invention, the lens (145) in the LDU assembly (300) is a coupling lens.

In accordance with an embodiment of the present invention, the optical bench (120) is a transparent optical substrate with a plurality of protrudes. Moreover, the plurality of passive optical components (110) is assembled on the transparent optical substrate, meaning the optical bench (120).

Figure 2A:
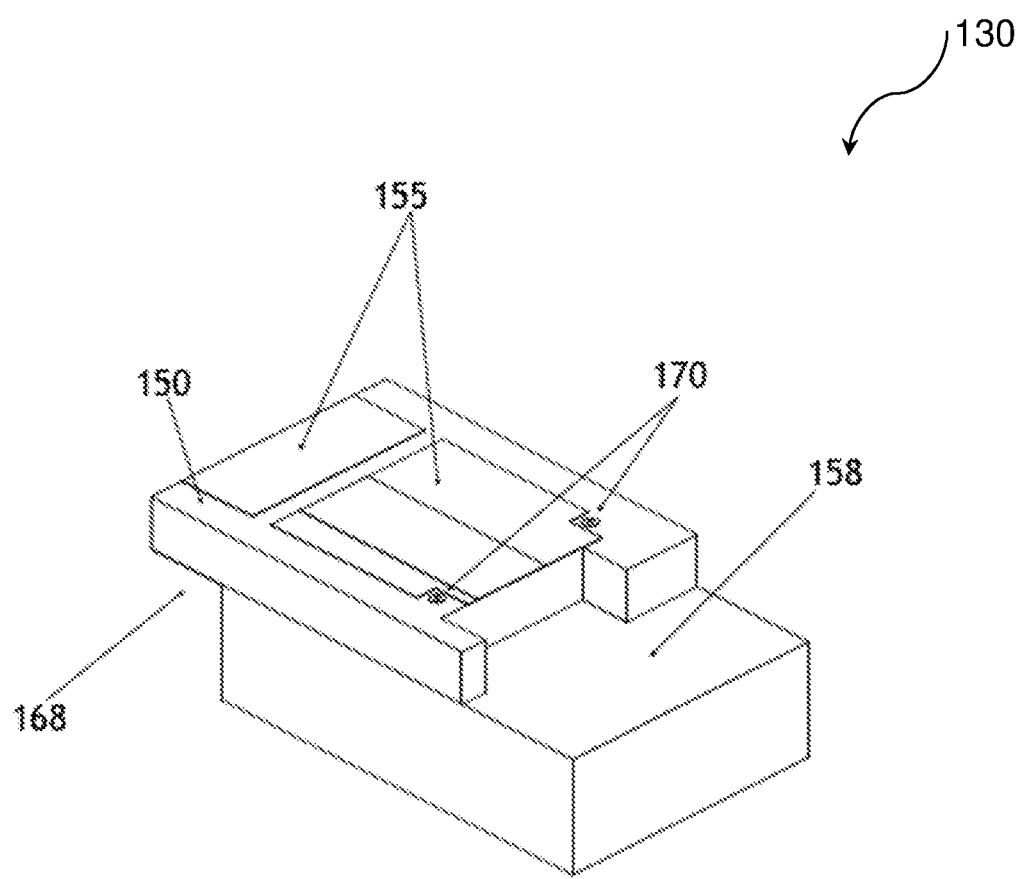
FIG. 2A is a pictorial representation illustrating a front perspective view of a cascade LDU in accordance with an embodiment of the present invention.
Figure 2B:
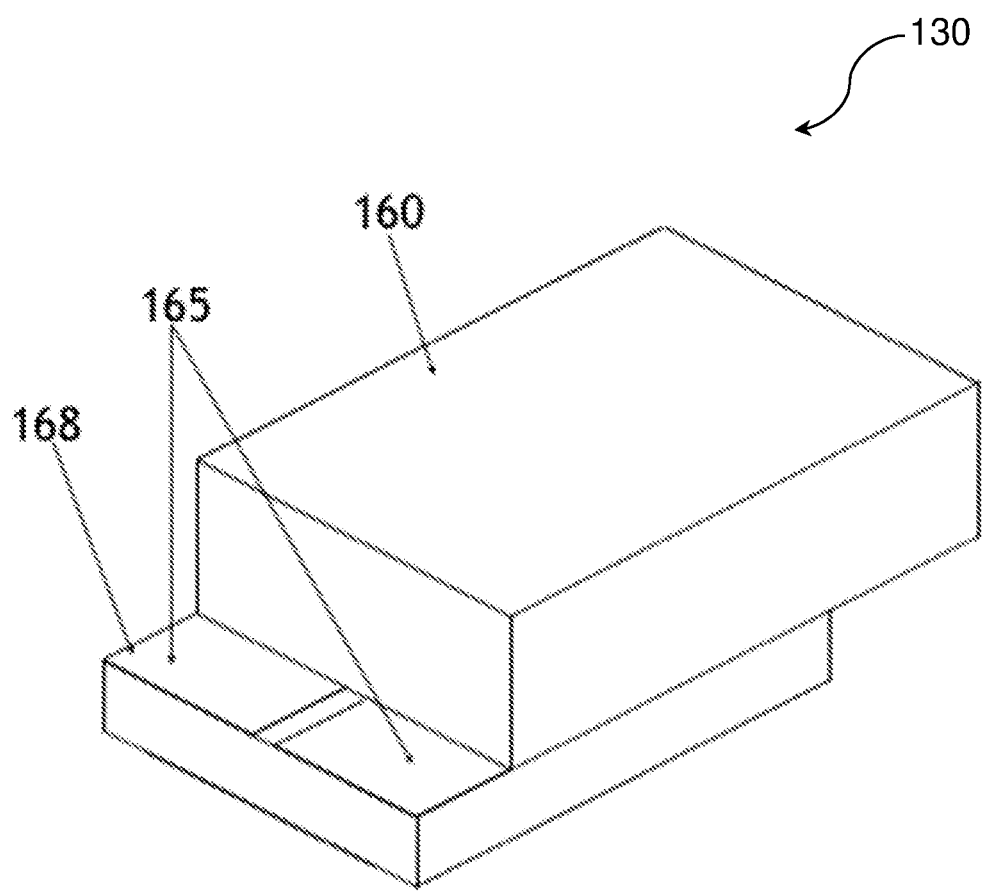
FIG. 2B is a pictorial representation illustrating a view of the back-perspective view of the cascade LDU in accordance with an embodiment of the present invention.

FIG. 2A and FIG. 2B is a pictorial representation illustrating a front perspective view and a back-perspective view of the cascade LDU in accordance with one or more embodiments of the present invention. In particular, the cascade LDU (130) further includes a front recess (158) and a back recess (168). In particular, the front surface (150) of cascade LDU (130) is configured with a plurality of front metal pads (155). And, the back surface (160) having the back recess (168) is configured with a plurality of back metal pads (165). Moreover, the plurality of back metal pads (165) is connected to the plurality of front metal pads (155) through an electrical connection (170). Furthermore, the electrical connection (170) is anyone electrical connection selected from a vertical interconnect access electrical connection and sidewall metal edge connection (not shown in FIG. 2A).

In particular, the front recess (158) of the cascade LDU (130) is configured with an optical platform for active alignment of the lens (145).

Subsequently, the back recess (168) of the cascade LDU (130) is operably configured with a wire bond platform for forming an electrical wire bond to power up the laser diode (140).

In accordance with one embodiment of the present invention, the electrical connection (170) is a vertical interconnect access electrical connection.

In accordance with another embodiment of the present invention, the electrical connection (170) is a sidewall metal edge connection.

Figure 3:
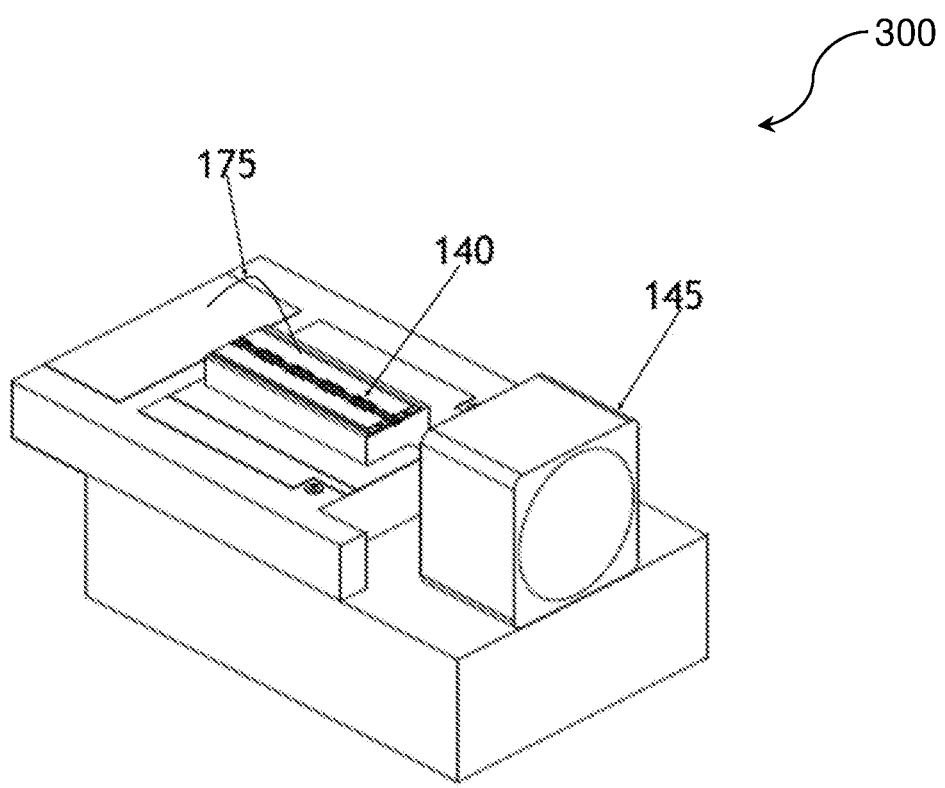
FIG. 3 is a pictorial representation illustrating a perspective view of an LDU assembly in accordance with an embodiment of the present invention.

FIG. 3 is a pictorial representation illustrating a perspective view of an LDU assembly in accordance with an embodiment of the present invention. In particular, the LDU assembly (300) includes the laser diode (140) and the lens (145). In particular, the laser diode (140) is deposited on the cascade LDU (130) by die attach and wire bond forms electrical connection (170) to power up the laser diode (140). Moreover, the electrical connection (170) is connected to the plurality of back metal pads (165) on the back recess (168) through anyone of the electrical connection (170) selected from the vertical interconnect access electrical connection and the metal edge electrical connection. Furthermore, the front recess (158) provides the platform for actively aligning the center of the lens (145) with the light from the laser diode (140) for good optical power coupling.

Subsequently, the lens (145) is fixed with an adhesive or a solder in front of the laser diode (140) on the platform provided by front recess (158) of the cascade LDU (130).

Figure 4A:
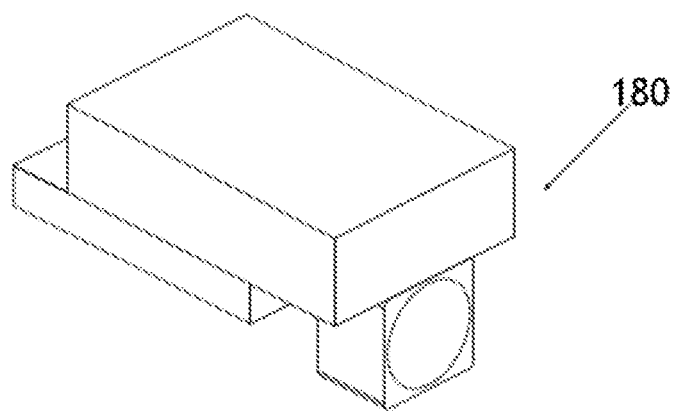
FIG. 4A is a pictorial representation illustrating an exploded view of a flipped cascade LDU in accordance with an embodiment of the present invention.

FIG. 4A is a pictorial representation illustrating an exploded view of a flipped cascade LDU in accordance with an embodiment of the present invention. The cascade LDU (130) is flipped with the bottom side up to form a flipped cascade LDU (180). In particular, the flipped cascade LDU (180) is operably configured for dissipating heat in the upward direction. Moreover, the flipped cascade LDU is mounted over a U-shape block (135) to form the signal source (105). In particular, the signal source is an independent signal source.

Figure 4B:
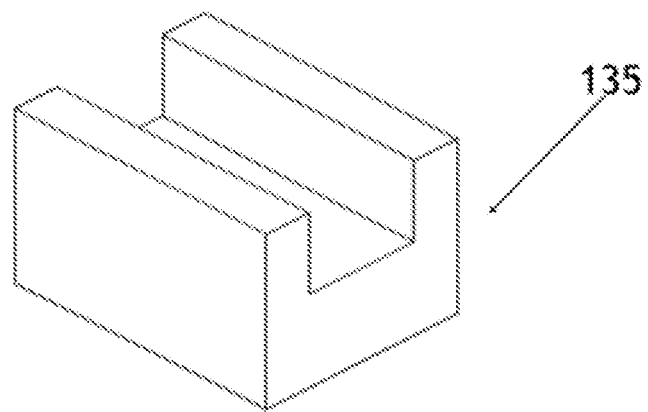
FIG. 4B is a pictorial representation illustrating an exploded view of the U-shape block in accordance with an embodiment of the present invention.

FIG. 4B is a pictorial representation illustrating an exploded view of the U-shape block in accordance with an embodiment of the present invention. In particular, the U-shape block (135) is made of a material having a lower thermal conductivity than the cascade LDU (130). Moreover, the lower thermal conductivity of the U-shape block (135) conducts the heat in the upward direction to enter into flipped cascade LDU (180) and transfer to the outer heatsink (185) through the heat sink contact method. Thereby, significantly reducing the temperature of the photonic integrated circuit (115).

Figure 4C:
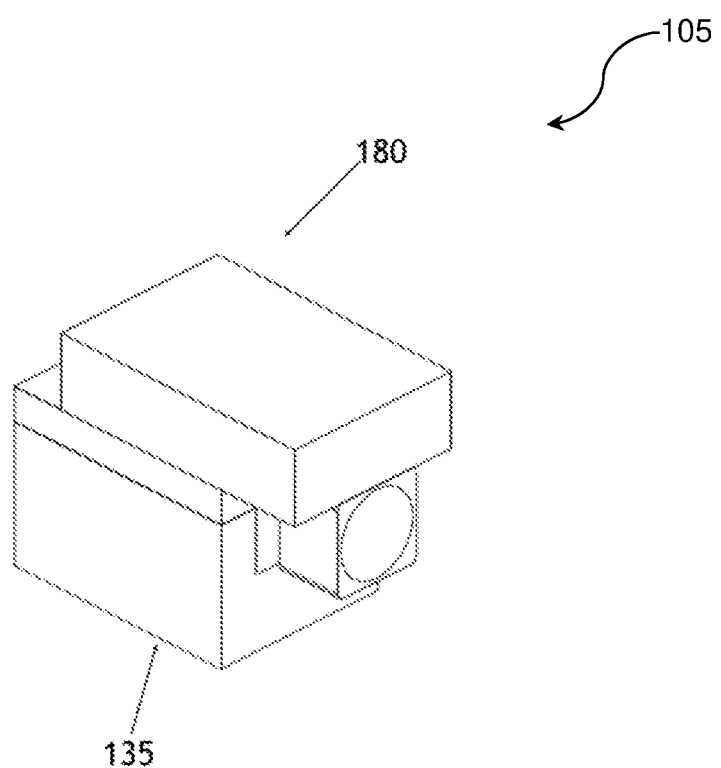
FIG. 4C is a pictorial representation illustrating an isometric view of an independent signal source unit in accordance with an embodiment of the present invention.

FIG. 4C is a pictorial representation illustrating an isometric view of an independent signal source unit in accordance with an embodiment of the present invention. In particular, the signal source (105) is formed by incorporating the laser diode (140) and lens (145) inside the U-shape block (135) and depositing the flipped cascade LDU (180) on the U-shape block (135). Moreover, the signal source (105) is actively aligned to the photonic integrated circuit (115) through the plurality of passive optical components (110).

Figure 5:
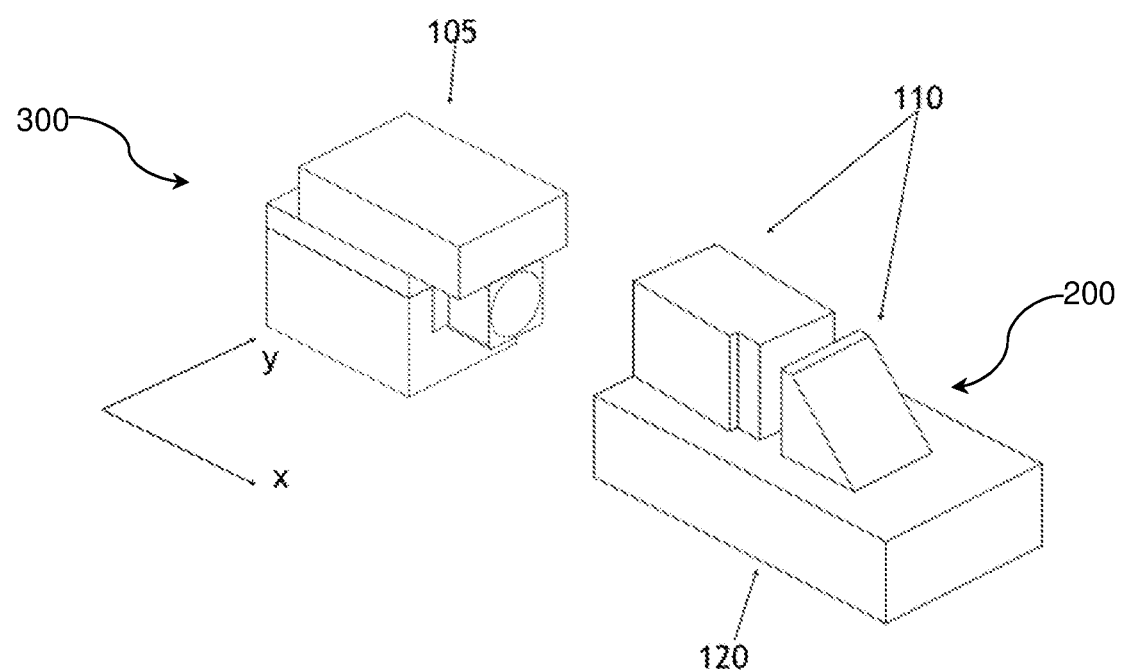
FIG. 5 is a pictorial representation illustrating an active alignment of an LDU assembly and an optical assembly of transmitter optical sub-assembly (TOSA) structure in accordance with an embodiment of the present invention.

FIG. 5 is a pictorial representation illustrating an active alignment of an LDU assembly and an optical assembly of transmitter optical sub-assembly (TOSA) structure in accordance with an embodiment of the present invention. In particular, the) transmitter optical sub-assembly (TOSA) structure comprises active alignment of optical bench assembly (200 and signal source (105). Moreover, the signal source (105) are aligned simultaneously to the photonic integrated circuit (115) for maximum coupling efficiency into the grating coupler. At the maximum power output, the optical bench assembly (200) and the signal source (105) are fixed on top of the photonic integrated circuit (115) by applying ultra-violet light (UV) curable adhesive or thermal curable adhesive. Finally, the wire bond (175) forms from the back metal pads (165) at back recess (168) to PCB control board completing the electrical connection (170) for the laser diode (140).

Figure 6:
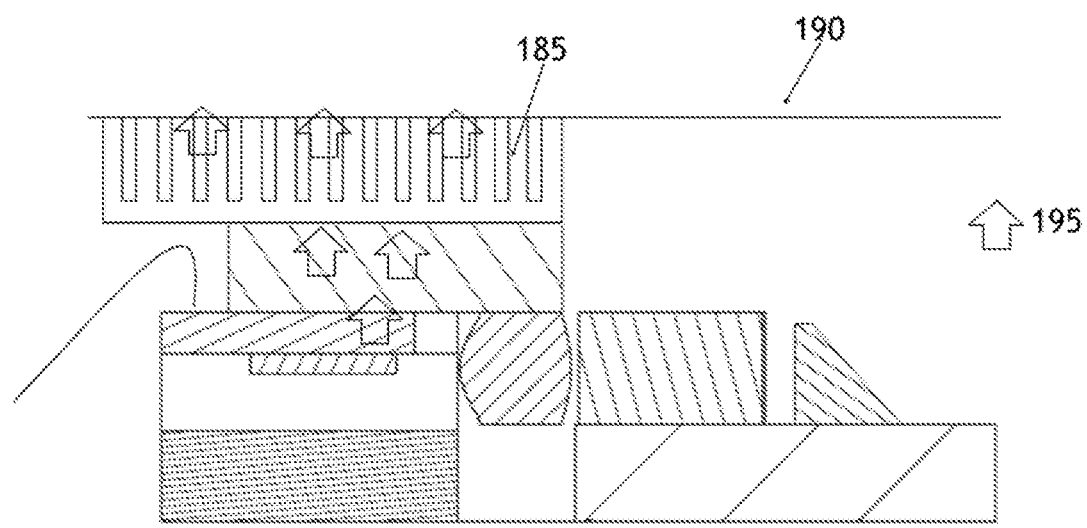
FIG. 6 is a pictorial representation illustrating a heat dissipation path of transmitter optical sub-assembly (TOSA) structure in accordance with an embodiment of the present invention.

FIG. 6 is a pictorial representation illustrating a heat dissipation path of transmitter optical sub-assembly (TOSA) structure in accordance with an embodiment of the present invention. The arrow in FIG. 6 illustrates the heat dissipation path (195) in the upward direction.

In particular, the heat is generated at the laser diode (140) and the U-shape block (135) having lower thermal conductivity than the flipped cascade LDU (180) conducts the heat in the upward direction to enter into flipped cascade LDU (180) and transfer to the outer heatsink (185) through the heat sink contact. Thereby, significantly reducing the temperature of the photonic integrated circuit (115).

In accordance with an embodiment, the U-shape block (135) is separated from the optical bench (120) such that there is no heat pass from the U-shape block (135) into the optical bench (120). Thus, preventing an epoxy failure due to high temperature.

In accordance with an embodiment of the present invention, the transmitter optical sub-assembly (TOSA) structure is configured with at least one independent thermal signal source having an independent heat dissipation path.

Figure 7:
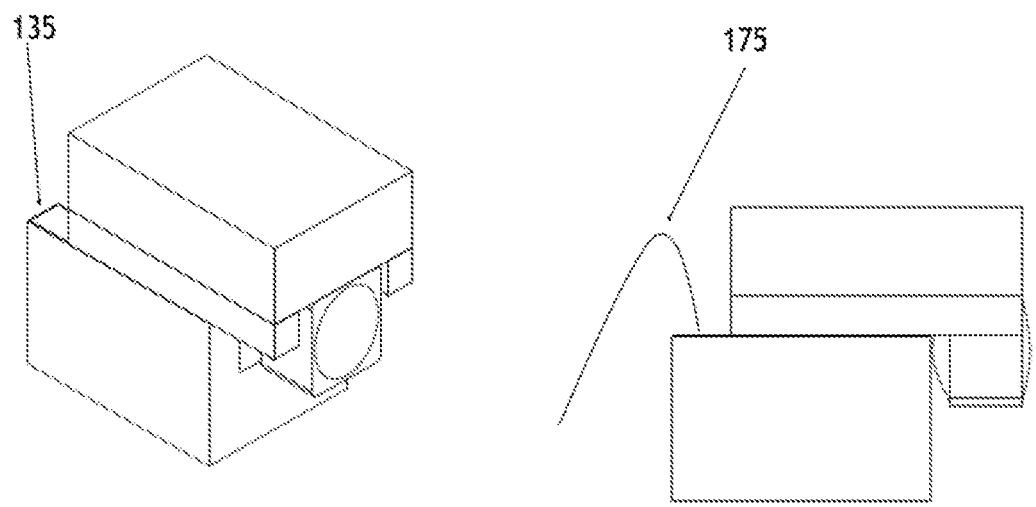
FIG. 7 is a pictorial representation illustrating a perspective view of the flipped cascade LDU assembly having the U shape block in accordance with an embodiment of the present invention.

FIG. 7 is a pictorial representation illustrating a perspective view of the flipped cascade LDU assembly having the U shape block in accordance with an embodiment of the present invention. In an exemplary example, the cascade LDU (130) has only one front recess flipped on the U-shape block (135). In particular, the back accommodating the wires for wire bonding is moved to another layer on the top surface of the U-shape block (135). The electrical connection 170 is formed from the front metal pad 155 to the metal layer moved to the top surface of the U-shape block (135).

Figure 8A:
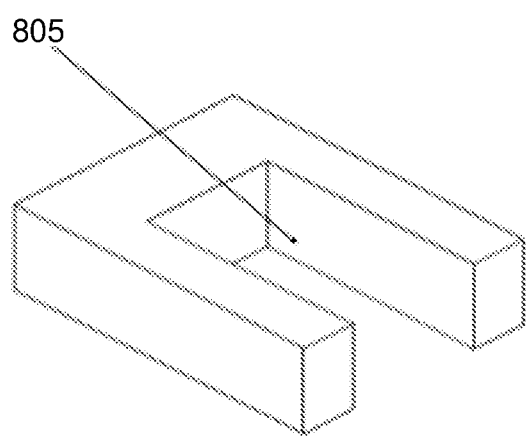
FIG. 8A is a pictorial representation illustrating a perspective view of a U-shape block having a front opening in accordance with an embodiment of the present invention.

FIG. 8A is a pictorial representation illustrating a perspective view of a U-shape block having a front opening in accordance with an embodiment of the present invention. In particular, the U-shape block with a front opening (805).

Figure 8B:
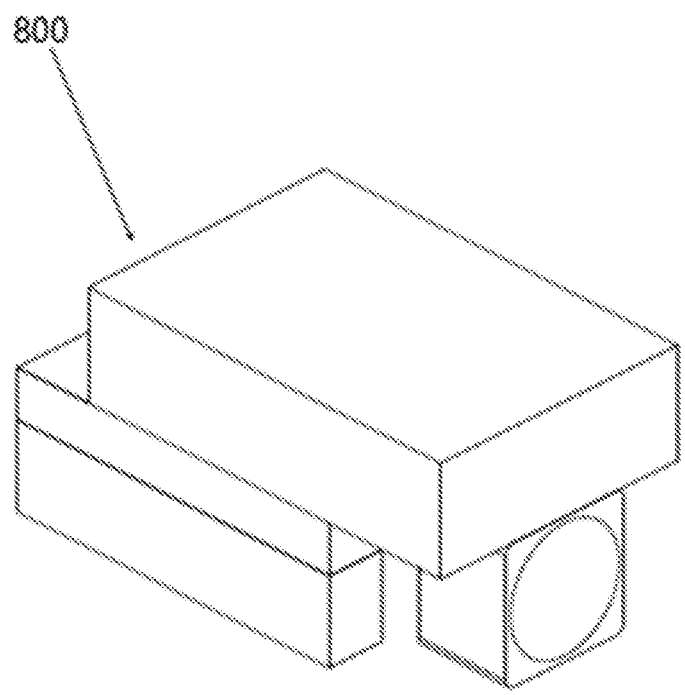
FIG. 8B is a pictorial representation illustrating a perspective view of the flipped cascade LDU assembly having the U-shape block with the front opening in accordance with an embodiment of the present invention.

FIG. 8B is a pictorial representation illustrating a perspective view of flipped cascade LDU assembly having the U-shape block with the front opening in accordance with an embodiment of the present invention. In particular, the assembled signal source 800 includes U-shape block with the front opening.

In accordance with another embodiment of the present invention, the assembled signal source includes a U-shape block with an opening on any side and the opening is not limited to the front opening (805).

In accordance with yet another embodiment of the present invention, the U-shape block (135) is a U-shape block with an upper opening.

In accordance with yet another embodiment of the present invention, the U-shape block (135) is a U-shape block with a side opening.

Figure 9:
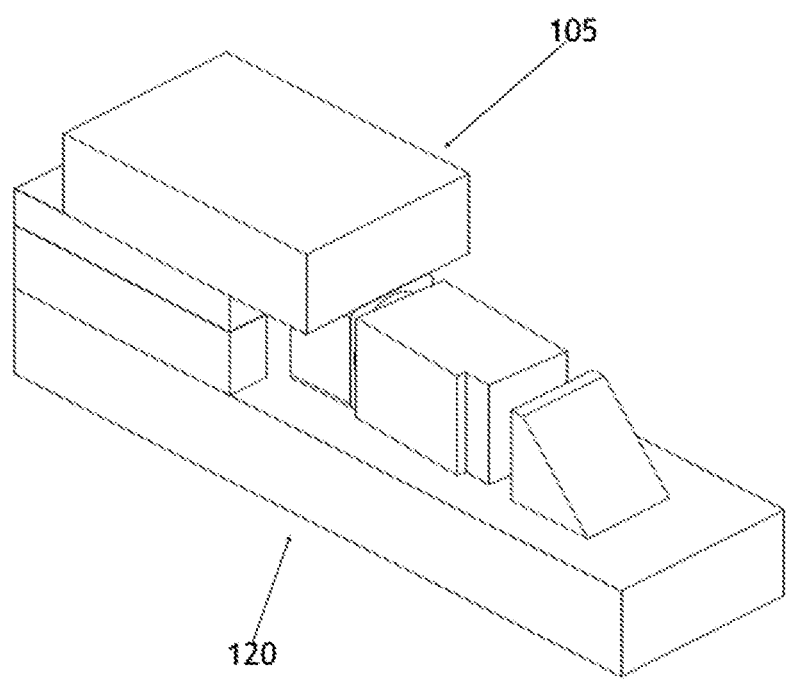
FIG. 9 is a pictorial representation illustrating a perspective view of an optical bench in accordance with an embodiment of the present invention.

FIG. 9 is a pictorial representation illustrating a perspective view of an optical bench in accordance with an embodiment of the present invention. In particular, the optical bench (120) is not separated from the cascade LDU (130). The heat dissipation path is in the upward direction if the U-shape block is made of a material having a lower thermal conductivity than the cascade LDU (130). The lower thermal conductivity enables the U-shape block (135) to conduct the heat in the upward direction to enter into the cascade LDU (130) transferring directly through the heat sink contact method to the outer heatsink (185).

In accordance with one embodiment of the present invention, the optical bench (120) is a stand-alone glass bench.

In accordance with another embodiment of the present invention, the optical bench (120) is a long glass bench.

Figure 10:
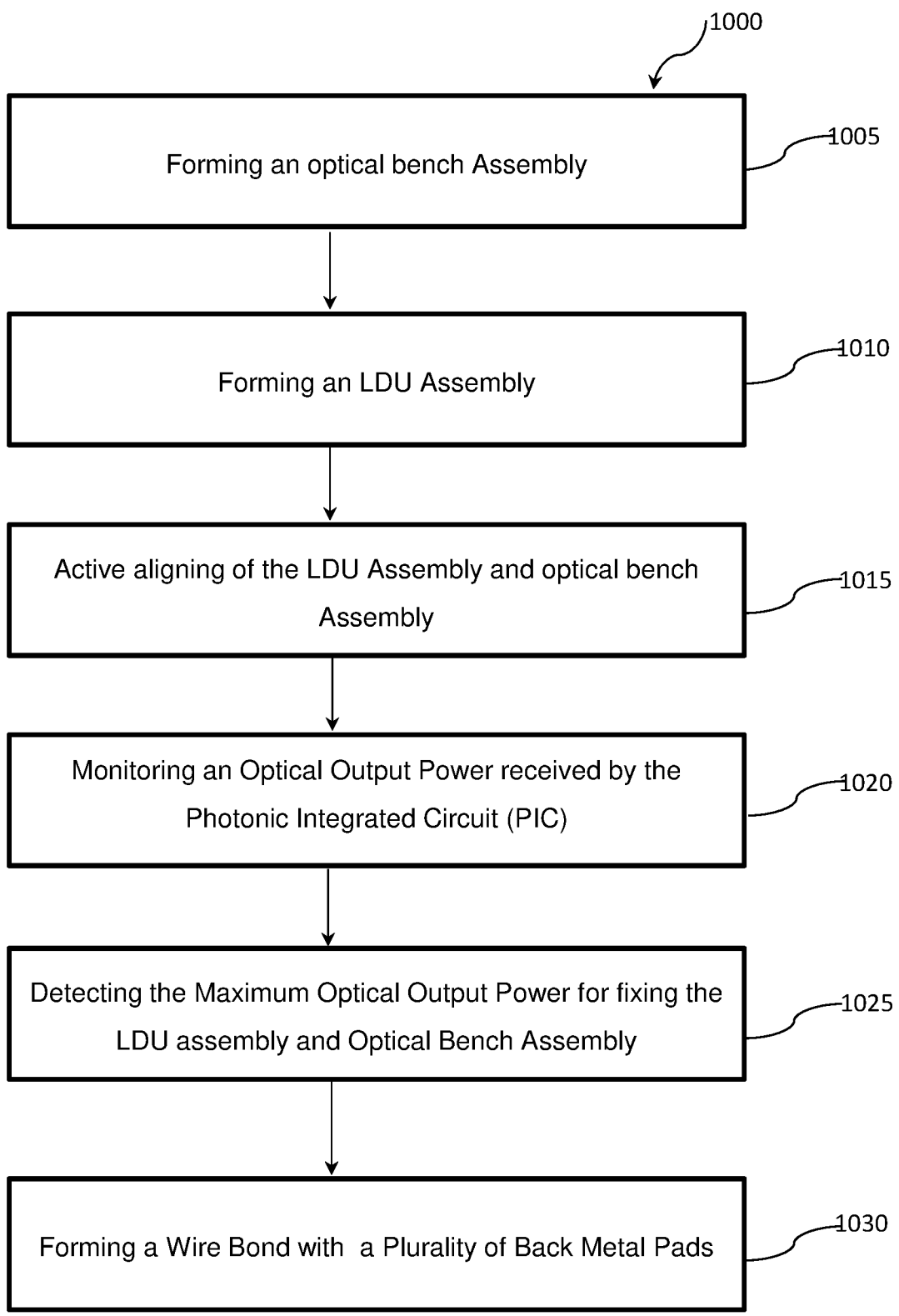
FIG. 10 is a flow chart illustrating an active alignment method of a transmitter optical sub-assembly (TOSA) structure in accordance with an embodiment of the present invention.

FIG. 10 is a flow chart illustrating an active alignment method of a transmitter optical sub-assembly (TOSA) structure in accordance with an embodiment of the present invention. The method 1000 starts at step 1005. At step 1005, an optical bench assembly is formed by assembling the plurality of passive optical components on an optical bench and the optical bench on the photonic integrated circuit to couple light into an optical waveguide.

Step 1005 proceeds to step 1010. At step 1010, the LDU assembly is formed. The LDU assembly is formed by assembling flipped LDU assembly with bottom-side up on the U-shape block.

Step 1010 proceeds to step 1015. At step 1015, the LDU assembly and optical bench assembly is actively aligned with the photonic integrated circuit for maximum coupling efficiency.

Step 1015 proceeds to step 1020. At step 1020, an optical output power received by the photonic integrated circuit is monitored.

Step 1020 proceeds to step 1025. At step 1025, a maximum optical output power is detected for fixing the LDU assembly and optical bench assembly on a top of the photonic integrated circuit. In particular, the LDU assembly and optical bench assembly is fixed on the top of the photonic integrated circuit by applying a thermally curable adhesive.

Step 1025 proceeds to step 1030. At step 1030, a wire bond is formed with a plurality of back metal pads at a back recess to complete an electrical connection for the laser diode.

Figure 11:
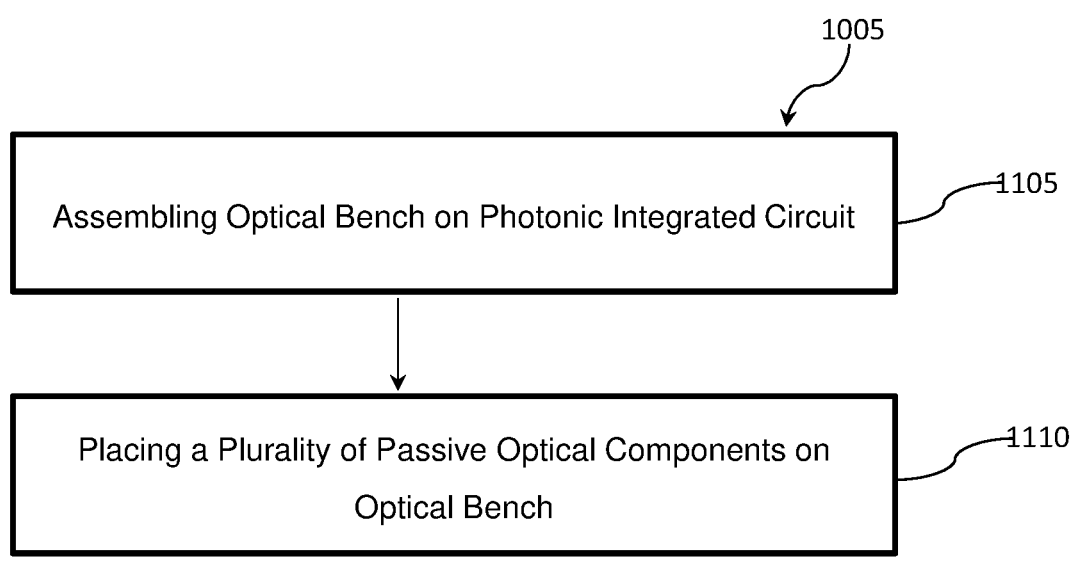
FIG. 11 is a flow chart illustrating a method for forming of the optical bench assembly in accordance with an embodiment of the present invention.

FIG. 11 is a flow chart illustrating a method forming of the optical bench assembly in accordance with an embodiment of the present invention. The method further comprises step 1105 and 1110. At step 1105, the optical bench is assembled on the photonic integrated circuit to couple light into an optical waveguide. And at step 1110, the plurality of passive optical components is placed on the optical bench using alignment marks. Moreover, the plurality of optical components is selected from a plurality of isolators and a plurality of prisms.

Figure 12:
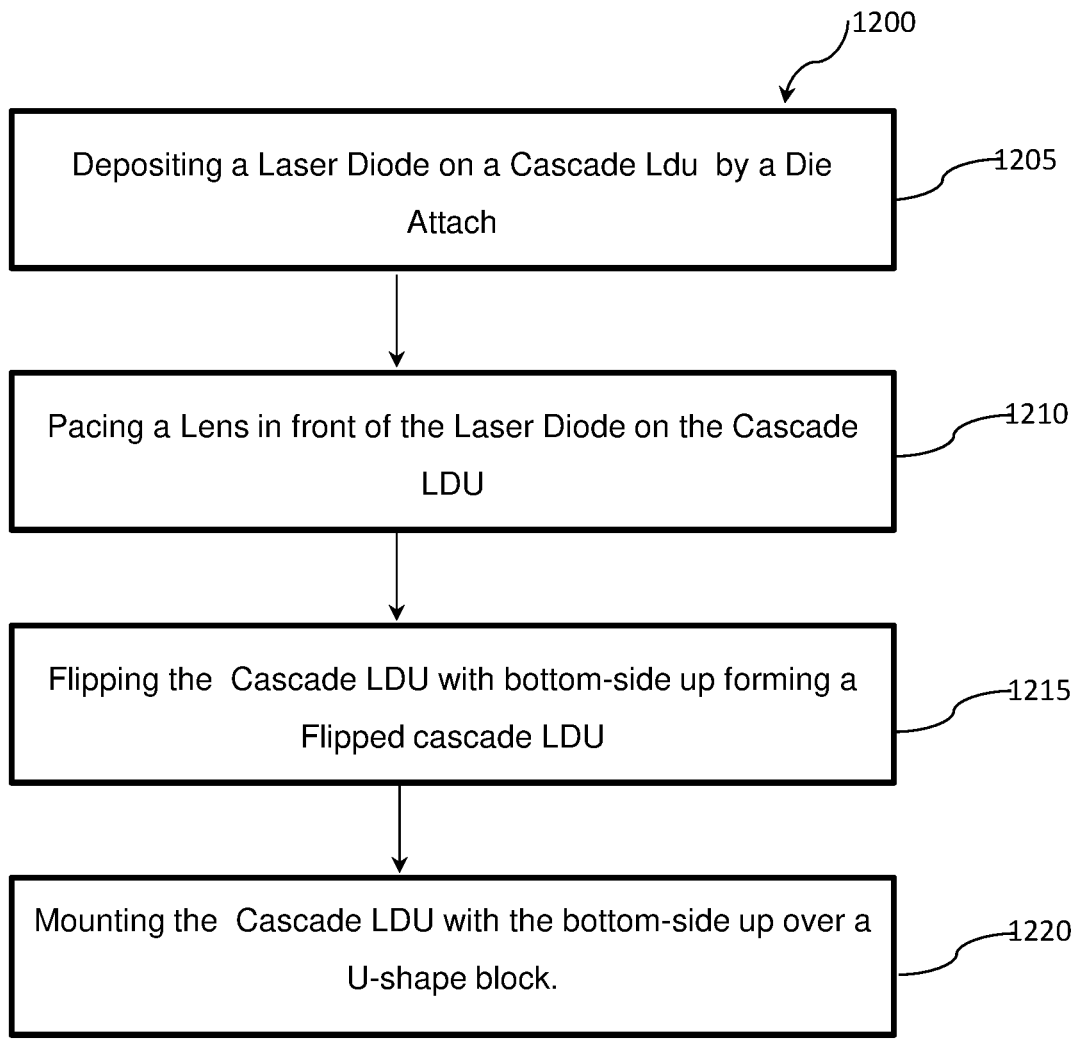
FIG. 12 is a flow chart illustrating a method for forming of the LDU assembly in accordance with an embodiment of the present invention.

FIG. 12 is a flow chart illustrating a method for forming the signal source of the LDU assembly in accordance with an embodiment of the present invention. The method 1200 starts at step 1205. At step 1205, the laser diode is deposited on the cascade LDU by the die attach.

Step 1205 proceeds to step 1210. At step 1210, the lens is actively assembled in front of the laser diode on the cascade LDU for good optical power coupling.

Step 1210 proceeds to step 1215. At step 1215, the cascade LDU is flipped with bottom-side up to form a flipped cascade LDU. In particular, the flipped cascade LDU is operably configured for dissipating heat in the upward direction.

Step 1215 proceeds to step 1220. At step 1220, the flipped cascade LDU is mounted on the U-shape block. Particularly, the U-shape block is made of a material having a lower thermal conductivity than the cascade LDU. Moreover, the lower thermal conductivity of the U-shape block conducts the heat in the upward direction to enter into flipped cascade LDU and transfer to the outer heatsink through the heat sink contact method. Thereby, significantly reducing the temperature of the photonic integrated circuit.

Figure 13:
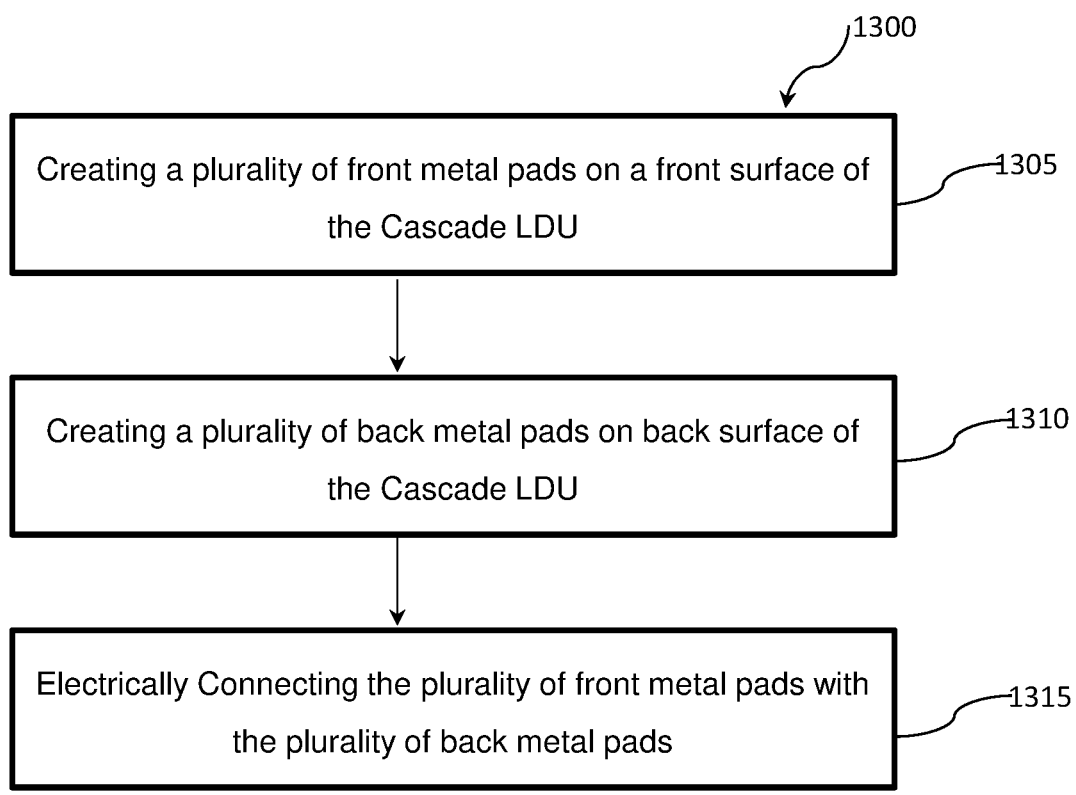
FIG. 13 is a flow chart illustrating a method for creating the cascade LDU in accordance with an embodiment of the present invention.

FIG. 13 is a flow chart illustrating a method for forming the cascade LDU in accordance with an embodiment of the present invention. The method 1300 starts at step 1305. At step 1305, a front recess is created on the front side of the cascade LDU. In particular, the front surface is configured with a plurality of front metal pads. Moreover, the front recess of the cascade LDU is configured with an optical platform for active alignment of the lens.

Step 1305 proceeds to step 1310. At step 1310, a back recess is created on the back side of the cascade LDU. In particular, the back surface recess is configured with a plurality of front back pads. Moreover, the back recess of the cascade LDU is operably configured with a wire bond platform for forming an electrical wire bond to power up the laser diode.

Step 1310 proceeds to step 1315. At step 1315, the front surface is electrically connected with the back surface. In particular, the plurality of back metal pads is electrically connected to the plurality of front metal pads through anyone electrical connection selected from a vertical interconnect access electrical connection and a sidewall metal edge connection.

Figure 14:
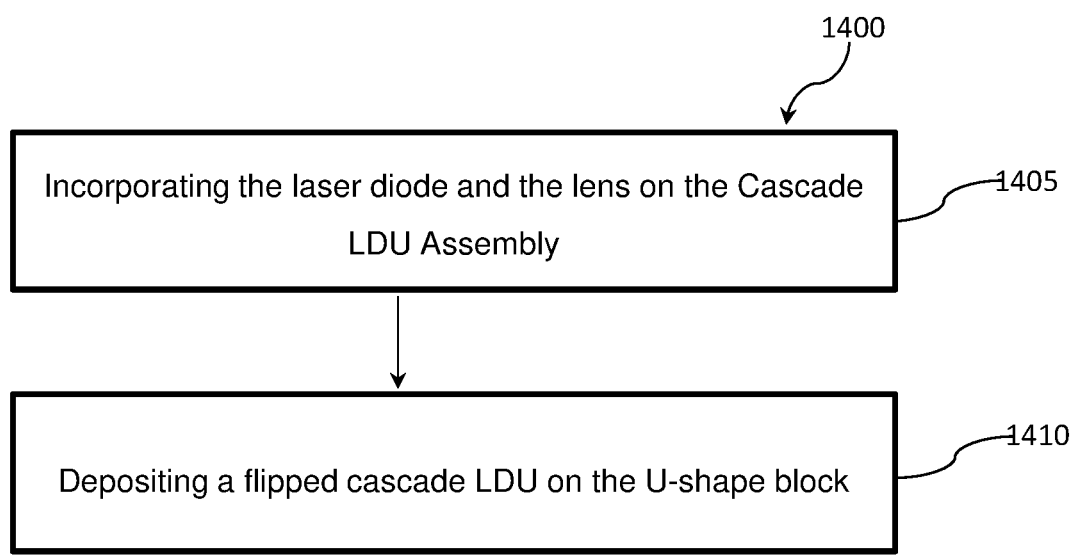
FIG. 14 is a flow chart illustrating a method for forming an independent signal source in accordance with an embodiment of the present invention.

FIG. 14 is a flow chart illustrating a method for forming an integrated signal source in accordance with an embodiment of the present invention. The method 1400 starts at step 1405 and proceeds to step 1410. At step 1405, the laser diode and the lens are incorporated on the cascade LDU assembly. And at step 1410, a flipped cascade LDU is deposited on the U-shape block. In particular, the integrated unit is actively aligned to the photonic integrated circuit through a plurality of passive optical components.

Thus, the embodiments of the present disclosure disclose the transmitter optical assembly (TOSA) structure having an independent upward heat dissipation path for dissipating heat in an upward direction and an active alignment method of the transmitter optical sub-assembly (TOSA) structure for efficient thermal management.

In accordance with one embodiment of the present invention, the transmitter optical sub-assembly (TOSA) structure includes the stand alone glass bench, U-shape block with an upper opening and the integrated signal unit.

In accordance with another embodiment of the present invention, the transmitter optical sub-assembly (TOSA) structure includes the stand alone glass bench, U-shape block with a side opening and the integrated signal unit.

In accordance with yet another embodiment of the present invention, the transmitter optical sub-assembly (TOSA) structure includes the long glass bench, U-shape block with upper opening and the integrated signal unit.

In accordance with yet another embodiment of the present invention, the transmitter optical sub-assembly (TOSA) structure includes the long glass bench, U-shape block with side opening and the integrated signal unit.

In accordance with yet another embodiment of the present invention, the independent upward heat dissipation path transfers heat to the outer heatsink through the outer heat sink contact method without passing through the photonic integrated circuit.

It should be noted that the invention has been described with reference to particular embodiments and that the invention is not limited to the embodiments described herein. Additional components may be integrated into LDU assembly and optical assembly if desired or necessary. The invention also is not limited to the materials used for the U-shape block, nor is the invention limited to the methods that are used to make the TOSA. Those skilled in the art will understand that other variations and modifications may be made to the embodiments described herein and that all such modifications or variations are within the scope of the invention.

What is claimed is:

1. A transmitter optical sub-assembly (TOSA) structure having an independent upward heat dissipation path for dissipating heat in an upward direction; the transmitter optical sub-assembly (TOSA) structure comprising:
   an independent signal source being a light source, the independent signal source comprising an LDU assembly and an optical bench assembly;
   the LDU assembly comprising:
   a laser diode emitting a plurality of optical signals;
   a cascade LDU holding the laser diode;
   a lens positioned in front of the laser diode on the cascade LDU; and
   the optical bench assembly comprising:
   an optical bench assembled on a photonic integrated circuit to couple light into an optical waveguide;
   a plurality of passive optical components assembled on the optical bench; and wherein the laser diode and the cascade LDU are independent from the plurality of passive optical components on the photonic integrated circuit.

2. The transmitter optical sub-assembly (TOSA) structure as claimed in claim 1, wherein the independent signal source is operably configured to actively align into an optical path for optical power coupling with the photonic integrated circuit.

3. The transmitter optical sub-assembly (TOSA) structure as claimed in claim 1, wherein the cascade LDU is flipped with bottom side up forming a flipped cascade LDU and the flipped cascade LDU is operably configured for dissipating the heat in the upward direction.

4. The transmitter optical sub-assembly (TOSA) structure as claimed in claim 3, wherein the flipped cascade LDU is mounted over a U-shape block.

5. The transmitter optical sub-assembly (TOSA) structure as claimed in claim 4, wherein the U-shape block is made of a material having a lower thermal conductivity than the cascade LDU.

6. The transmitter optical sub-assembly (TOSA) structure as claimed in claim 4, wherein the U-shape block is separated from the optical bench.

7. The transmitter optical sub-assembly (TOSA) structure as claimed in claim 4, wherein the independent signal source further comprising the laser diode and the lens incorporated in the U-shape block and the flipped cascade LDU deposited on the U-shape block.

8. The transmitter optical sub-assembly (TOSA) structure as claimed in claim 7, wherein the independent signal source is actively aligned to the photonic integrated circuit through the plurality of passive optical components.

9. The transmitter optical sub-assembly (TOSA) structure as claimed in claim 1, wherein the plurality of passive optical components further comprising one or more isolators and one or more prisms.

10. The transmitter optical sub-assembly (TOSA) structure as claimed in claim 1, wherein the cascade LDU further comprises:
    a front recess on a front surface of the cascade LDU is configured with a plurality of front metal pads;
    a back recess on a back surface cascade LDU is configured with a plurality of back metal pads; and
    the plurality of back metal pads is electrically connected to the plurality of front metal pads through any one electrical connection selected from a vertical interconnect access electrical connection and a sidewall metal edge connection.

11. The transmitter optical sub-assembly (TOSA) structure as claimed in claim 10, wherein the front recess of the cascade LDU is configured with an optical platform for active alignment of the lens.

12. The transmitter optical sub-assembly (TOSA) structure as claimed in claim 10, wherein the back recess of the cascade LDU is operably configured with a wire bond platform for forming a wire bond to power up the laser diode.

13. The transmitter optical sub-assembly (TOSA) structure as claimed in claim 1, wherein the optical assembly further comprising a transparent optical substrate with a plurality of protrusions.

14. The transmitter optical sub-assembly (TOSA) as claimed in claim 1, wherein the independent upward heat dissipation path transfers the heat to an outer heatsink through an outer heat sink contact method without passing through the photonic integrated circuit.

\* \* \* \* \*